United States Patent [19]

Nazarathy et al.

[11] Patent Number: 5,282,072
[45] Date of Patent: Jan. 25, 1994

[54] SHUNT-EXPANSIVE PREDISTORTION LINEARIZERS FOR OPTICAL ANALOG TRANSMITTERS

[75] Inventors: Moshe Nazarathy, Palo Alto; Anthony J. Ley, Los Altos; Hans C. Verhoeven, Mountain View, all of Calif.

[73] Assignee: Harmonic Lightwaves, Inc., Santa Clara, Calif.

[21] Appl. No.: 794,864

[22] Filed: Nov. 19, 1991

[51] Int. Cl.$^5$ .................. H04B 10/00; H03F 1/32
[52] U.S. Cl. .................. 359/157; 359/237; 328/162; 330/149
[58] Field of Search .......... 359/157, 237, 239; 328/162, 163; 330/149; 372/38

[56] References Cited

U.S. PATENT DOCUMENTS

| | | | |
|---|---|---|---|
| 4,943,783 | 7/1990 | Nojima | 330/149 |
| 4,987,378 | 1/1991 | Egglestan et al. | 330/149 |
| 4,992,754 | 2/1991 | Blauvelt . | |
| 5,119,392 | 6/1992 | Childs | 372/38 |
| 5,132,639 | 7/1992 | Blauvelt et al. | 330/149 |
| 5,161,044 | 11/1992 | Nazarathy . | |
| 5,172,068 | 12/1992 | Childs . | |

FOREIGN PATENT DOCUMENTS

158455  1/1983  Fed. Rep. of Germany .

OTHER PUBLICATIONS

Feasibility of Multi-Channel VSB/AM Transmission On Fiber Optic Links, Jack Koscinski, General Optronics Corp. Abstract.
Nazarathy et al., IEEE, 522 pages, pp. 2.3.3/1-4, 1981.
Melecon 81, 1st Med. Elect. Conf., Israel, May 28, 1981; abst. only suppl.
Levi et al; Int. Cable, vol. 3, #6, pp. 42, 44, 46, 48, 50, Jul. 1992; abst. only supplied.

*Primary Examiner*—Nelson Moskowitz
*Attorney, Agent, or Firm*—Steven F. Caserza

[57] ABSTRACT

This invention teaches new types of linearization circuits, exhibiting improved broadband suppression of nonlinear distortion. These realizations do not require the use of reactive elements such as capacitors, or of active elements such as transistors, eliminating the drawbacks of prior art realizations. The linearization circuits are particularly suitable for linearizing optical sources with odd wave voltage to light transfer characteristics, such as externally modulated CW lasers. The fundamental building blocks of the linearization circuits of this invention are novel nonlinear electrical one-ports with an expansive V-I characteristic, denoted as ENLOP (Expansive Nonlinear one-Ports). The ENLOP building blocks are further embedded in linear circuits.

65 Claims, 11 Drawing Sheets

SHUNT-EXPANSIVE PREDISTORTION LINEARIZERS FOR OPTICAL ANALOG TRANSMITTERS

FIELD OF THE INVENTION

This invention relates to electronic circuits for yielding a net linear output from an amplitude modulated transmission device which is inherently nonlinear, such an optical source comprising a CW laser and an external modulator. The linearization of a given nonlinear optical transmitter is achieved by passing the electrical input to the transmitter through an additional electronic nonlinear device, "the linearizer", the output of which is then routed to the optical source.

BACKGROUND

The problem of analog transmission via fiber optics, especially for Cable Television (CATV) transmission and distribution, has received strong impetus with the introduction of some AM fiber links based on novel distributed feedback (DFB) semiconductor lasers. Analog AM transmission systems and distribution networks benefit from fiber-optic transport, since the distance between electrical repeaters can be significantly increased as compared with electronic distribution networks. However, the requirements on second-order and third-order linearity are very stringent for directly modulated lasers to be used in the optical transmitters, since the presence of non-linearities causes intermodulation distortion which, in the case of CATV transmission for example, shows up as intolerable degradation of the television picture. Because of non-linearity of the optical source, the modulating signal amplitude has to be limited to small values in order to maintain the composite triple beat and second order distortion specifications under a tolerable level. A reduction of the optical source non-linearity would directly translate into the ability to increase the modulation signal amplitude while still maintaining the composite distortion specifications. An increased modulation amplitude (modulation index) is equivalent to better signal to noise ratio, i.e., the ability to distribute the analog signal over larger distances, to split the signal to more receiving sites, or to transmit more channels on the same link. The main obstacle with AM fiber transmission is how to overcome the non-linearity limitations of optical sources for analog transmission. Currently used approaches include:

1. Careful laser device selection, using distributed feedback lasers and other types of semiconductor low-noise lasers, and trying to carefully select individual devices or modify the fabrication process in order to produce a more linear response, for example preventing leakage current around the active lasing area. The problem with this approach is that currently the yield for devices with sufficient linearity is quite low, and reliable fabrication techniques for more linear laser devices have not yet been found.

2. Feedforward techniques, as described by J. Koscinski, "Feasibility of multichannel VSB/AM transmission on fiber optic links" NCTA Technical papers, Las Vegas 1987 p. 17. In these techniques, compensation of the nonlinearity is achieved by isolating the distortion produced in a nonlinear circuit and subsequently injecting the processed error back into the circuit. The disadvantages of these methods are in the requirements to use matched sources and the cost of two optical sources and the complexity of delay and gain balancing.

3. Negative feedback techniques, such as described by J. Koscinski, "Feasibility of multichannel VSG/AM transmission on fiber optic links," NCTA Technical papers, Las Vegas 1987, p. 17, rely on a photodiode to monitor the optical signal and provide the necessary feedback signal. The amount of distortion compensation depends on the feedback gain. Although the application of negative feedback is straightforward, large bandwidth requirements may create problems at high frequencies rendering this technique impractical.

An alternative to directly modulating lasers is using external modulators in conjunction with CW lasers. A directly modulated laser such as a DFB laser tends to be more sensitive to optical back reflection, and noisier than a CW laser which is modulated externally. The back reflection into the laser yields a non-linear light vs. current response when coupled with chirping effects of the directly modulated laser. The advantages of using modulators vs. lasers in terms of the non-linear intermodulation distortion have been discussed by G. E. Bodeep, T. E. Darcie, "Comparison of second and third order distortion in intensity modulated InGaAsP lasers and an $LiNbO_3$ external modulator," Paper WK2, OFC89' Conference on Optical Fiber Communications, Houston, Tex., February 1989, where it was concluded that external modulators tend to have lower second order distortion but higher third order distortion then directly modulated lasers. However, the ability to maintain the second order distortion of a modulator at a sufficiently low level cannot be taken for granted, and depends on how close to the quadrature point the device is biased. Fabrication imperfections, temperature changes, optical damage, and the like may cause the bias point to drift away from quadrature, in which case the second order distortion becomes more substantial. In order to use external modulators effectively for analog transmission applications, the drift in the bias point (which causes second harmonic distortion) as well as the third order harmonic distortion of the device must be eliminated or greatly reduced, since prior art modulators provide adequate linearity only over a very limited range around the quadrature point.

It is generally known that external modulators have a transfer characteristic that is considerably more stable than that of lasers. Unlike the lasers' light vs. current curve, the shape of the modulators, transfer characteristic is generally unaffected by optical power, temperature, aging, and the like, although the quiescent point of operation on the fixed transfer characteristic is affected by these factors.

If means were found to extend the linear range around the quadrature point, then the modulation index of the analog information signal could be increased and the performance of analog links improved, with better signal to noise ratio, and the ability to provide longer links.

Henry A. Blanvelt, Howard L. Loboda, "Predistorter for linearization of electronic and optical signals", U.S. Pat. No. 4,992,754 is applicable to the linearization of distributed feedback lasers but is not quite applicable to the linearization of external modulators in terms of the high suppression required.

Richard B. Childs and Vincent A. O'Byrne, "Multichannel AM Video Transmission using a high power Nd:YAG Laser and Linearized External Modulator" *IEEE Journal on selected areas in communication*, Vol. 8, No. 7, Sept 1990, Richard B. Childs and Vincent A. O'Byrne, "Predistortion linearization of directly modulated DFB lasers and external modulators for AM video transmission", WH-6 OFC '90, San Francisco, Calif., January 1990, and Richard B. Childs and Vincent A. O'Byrne, "50 Channel VSB-AM Video Transmission Employing a Linearized External modulator", PD23-1, OFC90, San Francisco, Calif., January 1990, refer to external modulator linearization by predistortion.

MATHEMATICAL DESCRIPTION OF LINEARIZATION

Let the source optical power output vs the applied voltage be written as $$P(V)+P_o \qquad (1)$$

where $P_o$ = average power

For example for an electro-optic modulator, the light vs voltage characteristic is described by a sine shape $V_\pi$ is a constant called the half wave voltage.

$$P=P_o+P_o \sin(\pi V/V_\pi); \qquad (2)$$

where $V_\pi$ is a constant called the half wave voltage.

The linearizer circuit should be conceived such that the compounding of the linearizer and optical source transfer characteristics is substantially linear. Let the linearizer be a nonlinear circuit described by the transfer characteristic $V=f(V_{in})$. The overall light power vs voltage transfer characteristic of the linearized source is $$P(f(V_{in}))+P_o \qquad (3)$$

We define an expansive/compressive characteristic $y(x)$ as one where the derivative $y'(x)$ is positive/negative, i.e. an expansive/compressive characteristic grows at a rate faster/slower than a linear characteristic. When inverting a function i.e. exchanging the roles of dependent and independent variables, if the original function was compressive/expansive then the inverted function becomes expansive/compressive.

By proper choice of the shape of the transfer characteristic f to have a curvature opposite in sign to that of the optical source, in effect approximating the inverse function of P, one can obtain an approximate overall linear characteristic. This is described in FIG. 1. In FIG. 1 the optical transfer characteristic is indicative of that of an external modulator biased at the quadrature point, however the discussion is valid for any optical source with an odd wave light vs voltage characteristic P(V) of the optical source (neglecting a fixed optical bias term $P_o$). The term odd wave for a characteristic $y(x)$ means that this characteristic is an odd function such that $$y(-x)=-y(x) \qquad (4)$$

An ideal linearizer would have a characteristic $$V=(V_\pi/\pi)a \sin(KV_{in}) \qquad (5)$$

with K some scale factor, yielding a linear overall characteristic $$P=P_o(1+KV_{in}) \qquad (6)$$

A somewhat less stringent approach to linearization, which nevertheless yields good results for linearization circuits for cable TV optical transmission sets out to synthesize an inverse function only in an approximate way, expressing both the optical source and linearizer circuit characteristics as power series and attempting to generate the inverse functions only for the lowest orders of the power series, in effect using inverse series.

Such descriptions of the linearization process are oversimplified in that they assume a memory-less model of the circuit, neglecting frequency dependent effects. In reality, these devices have finite bandwidths and associated frequency responses. A more complete description of the linearization process in the frequency domain is that the linearizer should generate distortion products which are equal in amplitude but opposite in phase with the distortion products generated by the given optical source. When the distortion products generated in the linearizer and the optical source sum up at the optical output of the source, a zero net distortion results.

Any real linearizer deviates from the ideal case in that the cancellation of distortion products is not perfect. A measure of the degree of distortion cancellation is the linearization suppression which is defined as the ratio of the distortion products of the unlinearized vs the linearized optical source—usually expressed in decibel.

As discussed in copending U.S. patent application Ser. No. 07/685,966 in order to maximize the linearization suppression at all frequencies, the amplitude frequency responses of the components of the linearizer circuits should vary as little as possible and the phase frequency responses should be as close to linear as possible.

A suppression of the distortion products of about 17 dB for 50 channels for 60 dBC CTB composite third order distortion products was reported in the Childs paper. Practical specifications of CATV distribution products are much more stringent, of the order of 60–80 channels, 26–20 dB suppression with better than 65 dBC CTB composite third order distortion products. In order to achieve such extended specifications, some of the problems associated with the linearizer architecture described in that prior work have to be circumvented, which is the topic of this invention.

The linearizer architecture used in the Childs reference is described in FIG. 2a, which depicts a prior art series linearizer architecture, which uses two strings of diodes inversely oriented and connected in series between the source and the load, biased by a bias current source with the bias isolated by capacitors which block the bias and transmit the high frequency signal but generate unwanted spurious nonlinear components. This architecture will be henceforth be called a series linearizer since the nonlinear element (the two branches of diodes and the capacitors and the DC biasing source) are inserted in series with the source and the load. The DC bias current source biases the diodes to a given bias at which point the capacitors essentially charge to fixed voltage to first order and thus act to first approximation as fixed bias voltage sources (FIG. 2b). A calculation of the I-V transfer characteristic of the nonlinear block inserted between the source and the load, using the well known diode law (neglecting a subtractive factor $I_s$):

$$I_d=I_s e^{V/V_T} \qquad (7)$$

yields $$I = I_S e^{\frac{V_B+V}{V_T}} - I_S e^{\frac{V_B-V}{V_T}} = 2I_S e^{\frac{V_B}{V_T}} \sinh\frac{V}{V_T} = \quad (8)$$

$$2I_B \sinh\frac{V}{V_T}$$

Thus, the V-I characteristic which is obtained by inverting the I-V characteristic for the nonlinear series block used in the Childs reference is given by $$V_T \text{asinh}(I/2I_B), \quad (9)$$

with asinh being the inverse hyperbolic sine function. This equation describes a compressive nonlinear V-I impedance characteristic.

Given this compressive characteristic, i.e. an impedance that decreases with increasing drive signal, an intuitive description of the operation of the device follows: Imagine that the input voltage is steadily increased—as the current through the diodes increases, the impedance of the nonlinear series block decreases. Thus the transmission through the series nonlinear block increases and the voltage falling on the load increases at a rate faster than the rate of increase of the input signal. This results in an expansive nonlinear characteristic between $V_s$ and $V_o$, which is an odd function. When compounded with the compressive odd function nonlinear characteristic of the modulator, this characteristic yields a linear overall characteristic from $V_s$ to the lightwave intensity produced by the optical source. A necessary condition for the linearization is that the proper electronic fixed linear gain is utilized to interface between the linearizer circuit output and the modulator electrical input.

While such a circuit should work as described for arbitrarily small frequencies of operation, in practice, upon application to a multichannel broadband signal such as the CATV composite video signal, the circuit suffers from several detrimental effects:

1) Because of its series nature the linear part of the signal—the bulk of the signal—traverses the diodes along the same serial path along which the nonlinear distortion products generated in the diodes propagate. The diodes are thus subjected to a great range of variation in terms of the average biasing condition, as the composite multichannel signal fluctuates in average value and the capacitors vary in their voltage rather than being charged at fixed voltage as assumed in the simplistic description above. This detrimental effect can alternatively be described as a time-varying distortion or higher order distortion.

2) The two diode branches also generate harmonic distortion and intermodulation products (in short referred to as IM products) of even order, mainly of second order which circulate around loop L. Thus, frequency terms equal to the difference in the channel frequencies will circulate around loop L. The smallest difference between channel frequencies is the difference between adjacent channels (6 MHz for the U.S. NTSC TV channel scheme, for example). Thus, strong components at 6 MHz and multiples thereof circulate around loop L, these IM products will be phase shifted because of the capacitors, even for large practical values of the capacitors. The lower the frequency of these products the more they will be phase shifted. The component which will be most shifted is that at 6 MHz, assuming unmodulated carriers. These components will further interact through the nonlinearity of the diodes with the fundamental frequencies of the channels to generate higher order nonlinearities upon a set of frequencies which coincides with the set of third order intermodulation frequencies. These double second order IM products have a polarity orientation such that they reinforce at the output unlike the second order components that are confined to flow around loop L (which is why the transfer characteristic is an odd function.) As a particular case of the above described process, frequency components at zero frequency (essentially DC rectification) will be generated as intermodulation products of second order involving two equal frequencies. This will result in a variation of the nominal DC bias—a special case of the effect described in point 1.

Three general embodiments of linearization circuits have been described in co-pending U.S. patent application Ser. No. 07/685,966:

a. In the first embodiment (FIG. 13a of U.S. Ser. No. 85,966) two nominally identical one-ports are connected in series, inverted with respect to each other between the source and the load (the load may be preceded by a coupling network).

b. In the second embodiment (FIG. 13b of U.S. Ser. No. 685,966) two nominally identical one-ports are connected in parallel, inverted with respect to each other between the source and the load.

c. In the third embodiment (FIG. 13c of U.S. Ser. No. 685,966) two nominally identical one-ports are connected in a symmetric arrangement such that congruent inputs are connected to the two complementary outputs of a differential driver (which provides opposing polarities to its outputs) and the output is also taken differentially between congruent output ports.

Those embodiments are subject to their own limitations. In fact, embodiment (b) above covers the circuit of Childs, the limitations of which have been described above, embodiment (c) covers the specific embodiment of FIG. 16 of U.S. Ser. No. 685,966 which is based on transistors with diodes connected to the base and emitter. Such a scheme, while working in principle, may suffer in practice from frequency dependent degradations related to the phase shift variations and amplitude ripple of the circuit parameters of the transistors which may degrade the broadband operation of the linearization circuit, reducing the intermodulation suppression of the linearizer at certain frequencies.

It is an object of the present invention to overcome these drawbacks and improve the performance of the linearizing circuits in order to meet or exceed the CATV specifications mentioned above.

SUMMARY

This invention teaches new types of linearization circuits, exhibiting improved broadband suppression of nonlinear distortion. These realizations do not require the use of reactive elements such as capacitors, or of active elements such as transistors, eliminating the drawbacks of prior art realizations. The linearization circuits are particularly suitable for linearizing optical sources with odd wave voltage to light transfer characteristics, such as externally modulated CW lasers. The fundamental building blocks of the linearization circuits of this invention are novel nonlinear electrical one-ports with an expansive V-I characteristic, denoted as ENLOP (Expansive Nonlinear one-Ports). The ENLOP building blocks are further embedded in linear circuits in accordance with the teachings of this invention.

BRIEF DESCRIPTION OF THE DRAWINGS

FIG. 6a depicts a parallel connection of ENLOPs in the form of two antiseries diode ENLOPs as in FIG. 3a.

FIG. 11b is a graph depicting the transfer characteristic of the embodiment of FIG. 11a.

DETAILED DESCRIPTION OF SPECIFIC EMBODIMENTS EXPANSIVE NONLINEAR ONE-PORTS

Figure 1:
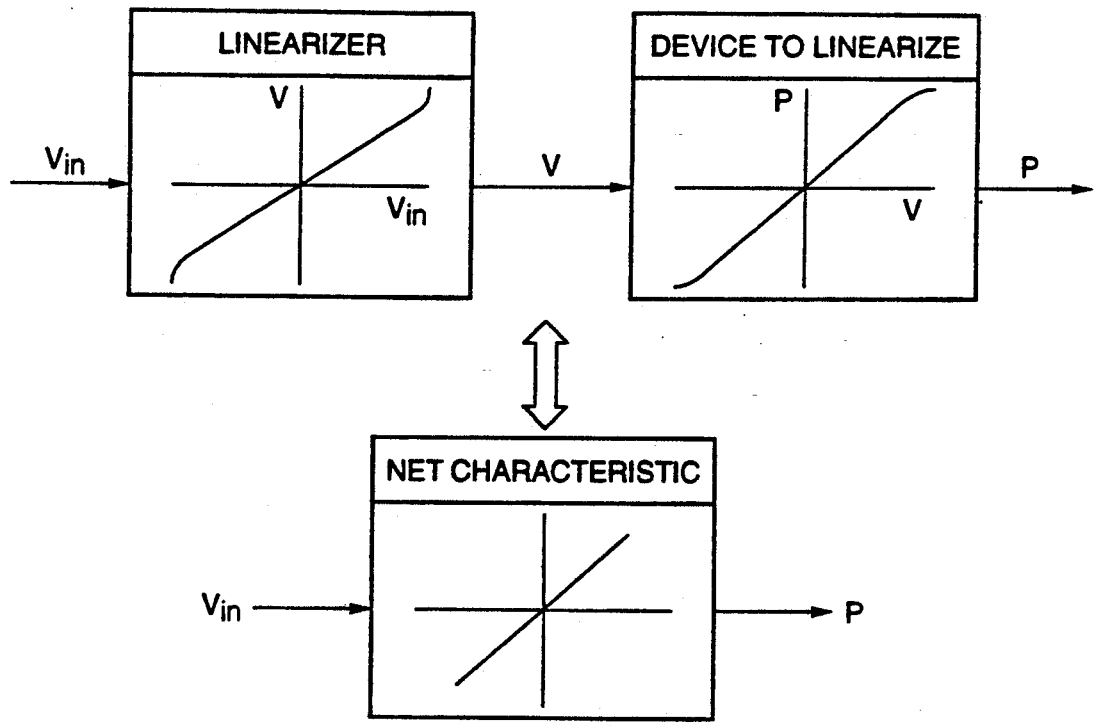
FIG. 1 are graphs depicting passing the electrical modulation input of an optical source through a suitable predistortion linearizer circuit of inverse transfer characteristic, yielding a net linear transfer characteristic.
Figure 2A:
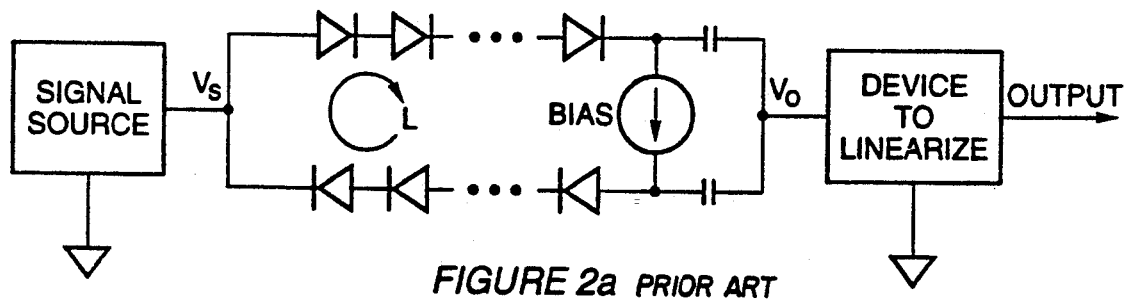
FIG. 2a depicts a prior art series linearizer architecture, which uses two strings of diodes inversely oriented and connected in series between the source and the load, biased by a bias current source with the bias isolated by capacitors which block the bias and transmit the high frequency signal but generate unwanted spurious nonlinear components.
Figure 2B:
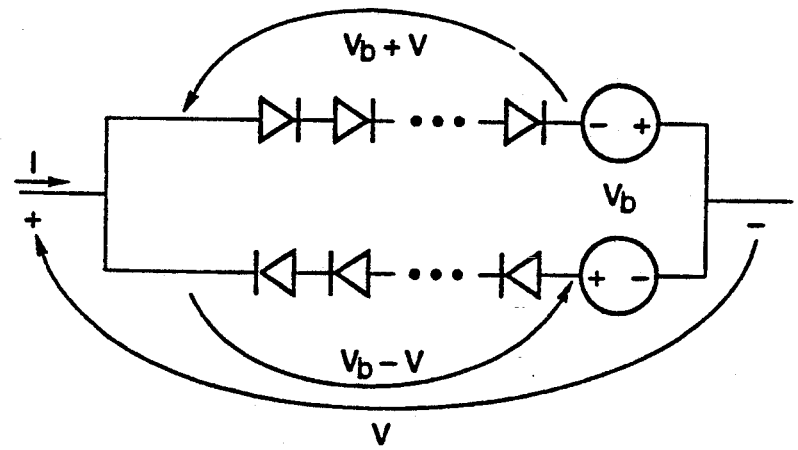
FIG. 2b depicts an approximate analysis of the circuit of FIG. 2a, performed by substituting voltage sources for the capacitors, corresponding to the voltages to which the capacitors charge due to the bias in the absence of an applied signal.
Figure 3C:
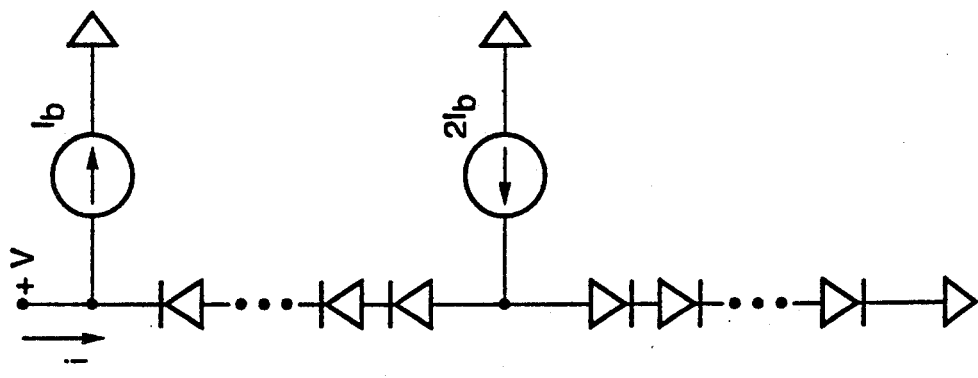
FIG. 3c depicts an alternative embodiment of an ENLOP, which differs from the embodiment of FIG. 3a by orientation of the diodes and current bias sources.
Figure 3B:
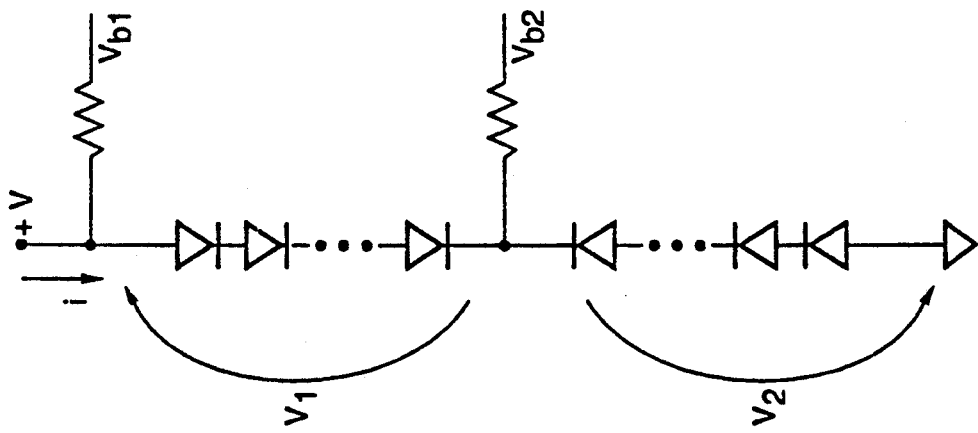
FIG. 3b depicts an approximate realization of the current bias sources as voltage sources in series with substantially large bias resistor values.
Figure 3A:
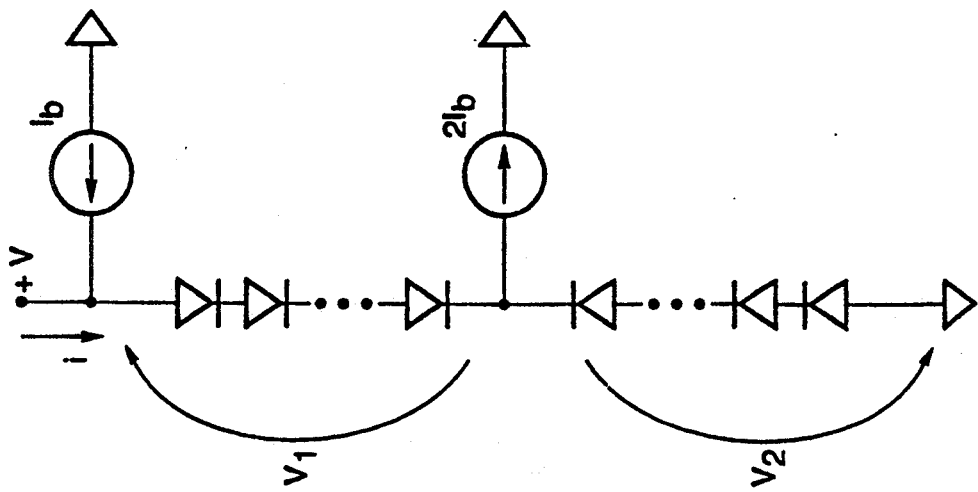
FIG. 3a depicts one embodiment of an ENLOP (Expansive Nonlinear One Port) realization in accordance with the teachings of this invention, as an antiseries diode one-port, suitable for use as a building block for linearizer circuits.

In a first embodiment of an ENLOP of this invention (FIG. 3a), which we further call an antiseries diode one-port (reference to these circuits as one-ports is from the RF signal point of view, discounting any terminals used for biasing), a number of diodes are placed back to back and biased as shown by means of current sources. The number of diodes pointing up is equal to the number of diodes pointing down, for odd-wave operation. The V-I characteristics of each diode string is compressive, yet the total V-I characteristic, which is the difference of the V-I characteristics of the two diode strings, is expansive. The bias sources could be approximated by voltage sources connected to large values of resistors as further shown in FIG. 3b. The directions of all diodes and current sources could be inverted as in FIG. 3c without detracting from the operation of the circuit. The currents provided by the bias sources are of 2:1 ratio so that the same bias currents $I_b$ flow through each diode. When the diodes are substantially identical, the V-I characteristic of such nonlinear one-port is odd-wave.

We next show that this characteristic is also expansive. Let the signal current flowing into the ENLOP be i, and the voltage across the ENLOP signal terminals be v. Then the combination of bias and signal currents results in total currents and respectively in the two diode branches. The voltages across the diodes are then given by $$V_1 = V_T \log(I_b + i) \tag{10}$$

$$V_2 = V_T \log(I_b - i) \tag{11}$$

Figure 4:
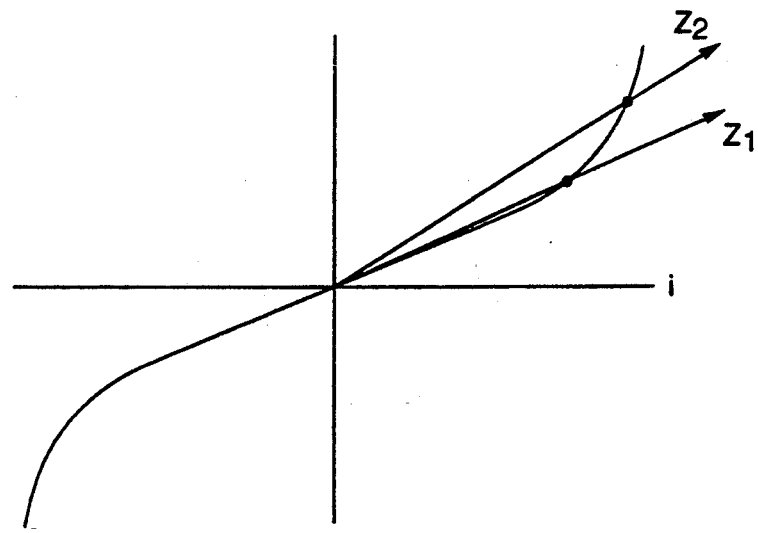
FIG. 4 is a graph depicting the expansive V-I characteristic of the antiseries diode one-port of FIGS. 3a, 3b, and 3c.

These V-I characteristics are each compressive, yet when combined the total voltage across the diodes as a function of current is expansive:

$$v = V_1 - V_2 = V_T \log \frac{I_b + i}{I_b - i} = 2V_T \mathrm{atanh} \frac{i}{I_b} \tag{12}$$

where an identity expressing the atanh function in terms of the log function is used. This expansive V-I characteristic is plotted in FIG. 4. The impedance, which is the slope of the chord from the origin to the point (I,V) on the characteristic, is an increasing function of the signal, e.g. $Z_1 < Z_2$ in the figure.

Figure 5:
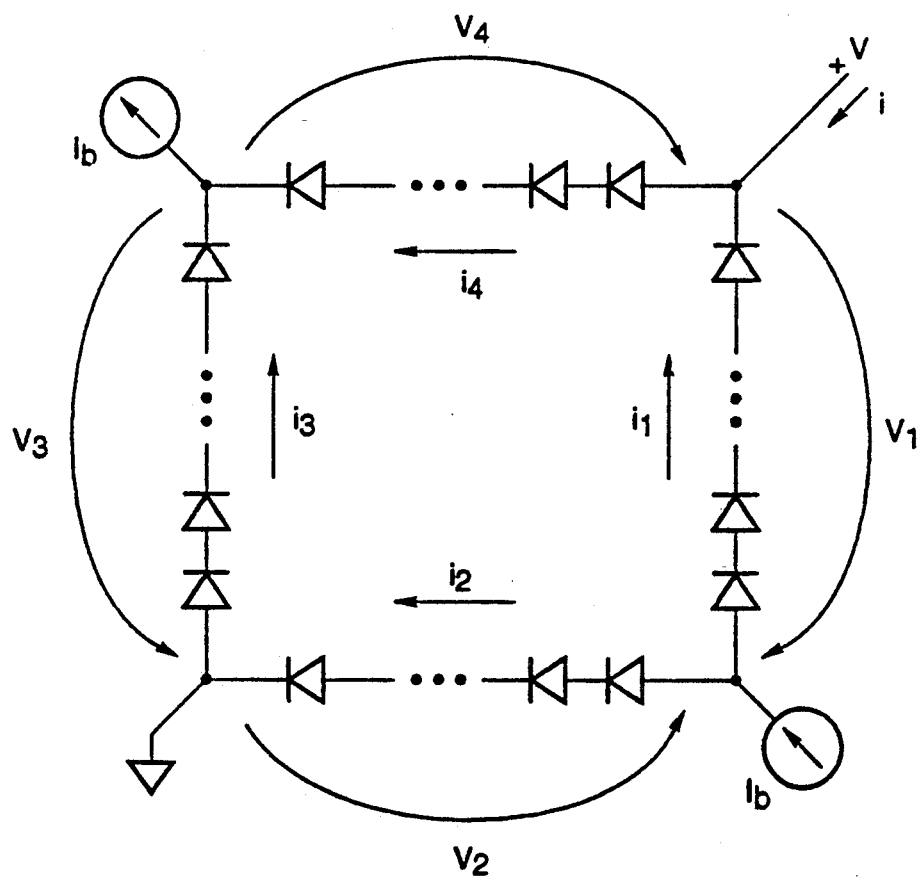
FIG. 5 is one embodiment of an ENLOP (Expansive Nonlinear One Port) realizated as a diode bridge one-port, which is suitable for use as a building block for linearizer circuits.

In a second embodiment of an ENLOP of this invention (FIG. 5), a diode bridge with an associated biasing scheme is used to obtain the ENLOP expansive odd wave characteristic, thus this version is further referred to as the diode bridge one-port. This circuit may be thought of as a parallel connection of two antiseries diode on-ports circuits of FIGS. 3a and 3c, with reversed orientations. Here $I_b$ are current bias sources, which can be approximated as voltage sources in series with substantially large bias resistor values. The conceptual transition between the two embodiments of FIGS. 3a and 3c and the one of FIG. 5 is accomplished by realizing that the upper side bias current sources can be removed since they are directed in opposite senses. The V-I characteristic of the diode bridge differs from that of a single arm antiparallel diode one-port by a factor of $\frac{1}{2}$ in the signal current which corresponds to the splitting (which is shown below to be equal) of the terminal current between the two arms due to the parallel addition of two one-ports with the same V-I characteristic. However the bias current is also split equally between the two arms, thus the two factors of $\frac{1}{2}$ in i and $I_b$ cancel, resulting in the same result as equation (12) for the I-V characteristic of the bridge.

A formal analysis substantiates the above shortcut derivation. According to the diode orientation and the polarities of the associated voltages, the voltage at the top of the bridge could be written as $$v = v_2 - v_1 = v_4 - v_3 \quad (13)$$

Using the diode equation this can be written as $$v = V_T \log i_2/i_1 = V_T \log i_4/i_3 \quad (14)$$

or $$i_2/i_1 = i_4/i_3 \quad (15)$$

In addition to this constraint on the branch currents, Kirkchoff's current law at the bias junctions yields $$i_4 + i_3 = I_b = i_1 + i_2 \quad (16)$$

The last three equations force the equalities:

$$i_4 = i_2 \quad (17)$$

$$i_3 = i_1 \quad (18)$$

from which it follows that $$i = i_4 - i_1 = i_2 - i_1 \quad (19)$$

$$I_b = i_1 + i_4 = i_1 + i_2 \quad (20)$$

Solving for $i_1$ and $i_2$ in terms of i and $I_b$ yields $$i_1 = \frac{I_b - i}{2} \quad (21)$$

$$i_2 = \frac{I_b + i}{2} \quad (22)$$

Finally, the V-I characteristic is obtained from $$v = V_T \log \frac{i_2}{i_1} = V_T \log \frac{I_b + i}{I_b - i} \quad (23)$$

which is identical to the previously obtained characteristic (e.g. 12).

Figure 6A:
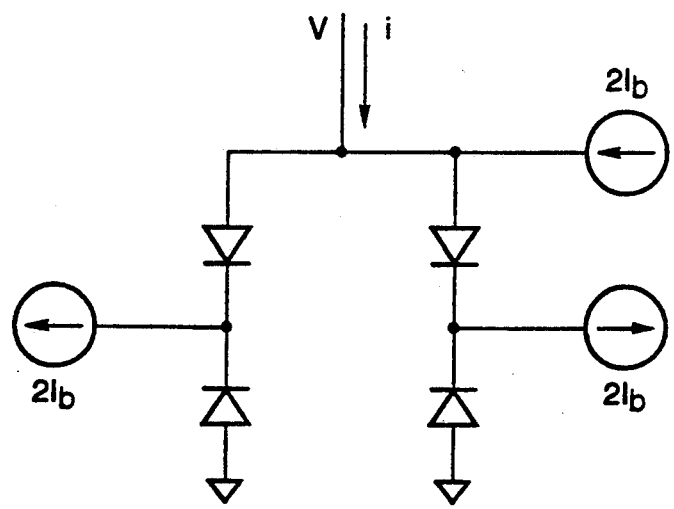
Figure 6B:
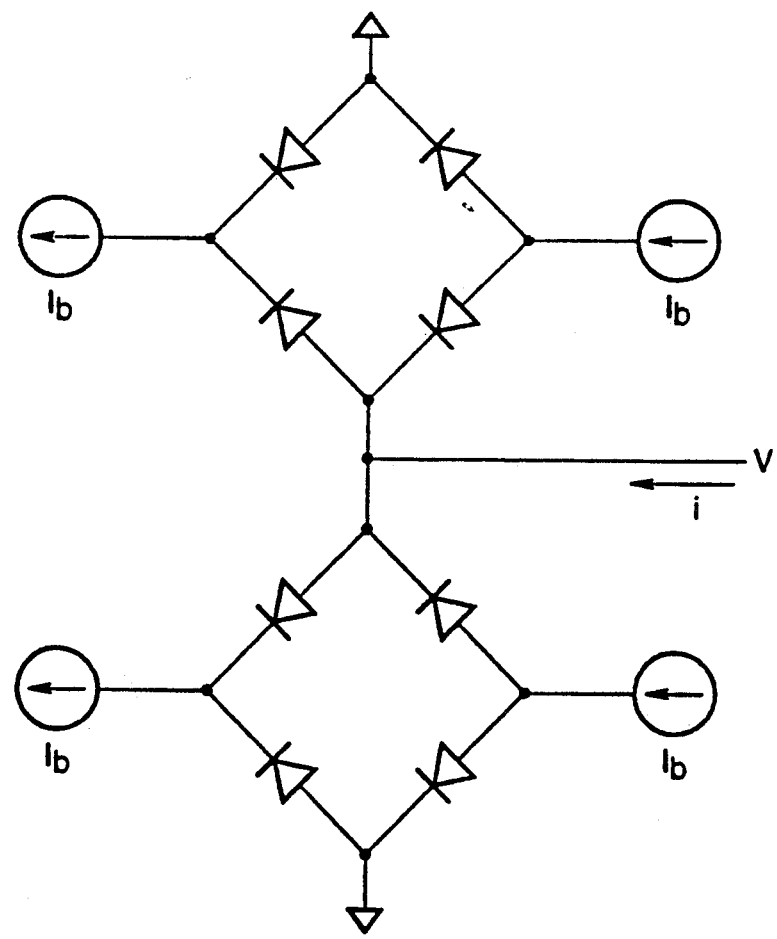
FIG. 6b depicts an alternative embodiment of a parallel connection of ENLOPs in the form of two diode bridge ENLOPs.

A general ENLOP is obtained by parallel connection of several simpler ENLOP units which are oriented with the diodes pointing either way. Some examples are shown in FIGS. 6a and 6b.

Somewhat similar configurations of diodes placed back to back, in a bridge, or in a ring often appear in microwave applications, albeit in totally different contexts as mixers, rectifiers, samplers, frequency multipliers, clippers, functional converters: See, for example, S. A. Maas, "Nonlinear Microwave circuits", Artech House, 1988 Section 5.1; F. Kouril, K. Vrba, "Nonlinear and parametric circuits", Ellis Horwood Limited, 1988; and Scott R. Gibson, "Gallium Arsenide lowers cost and improves performance of microwave counters", Hewlett Packard Journal, February 1986, give examples of diode sampler circuits, but none of these diode circuits are either relevant or directly applicable to the problem solved by this invention, namely that of broadband linearization of high frequency signals.

EMBEDDING SHUNT ARCHITECTURES FOR LINEARIZER CIRCUIT

According to the invention, ENLOP one-ports become fundamental building blocks for a class of novel linearizer circuits which we call shunt-expansive since the ENLOP building blocks are connected in shunt in these architectures.

Figure 7:
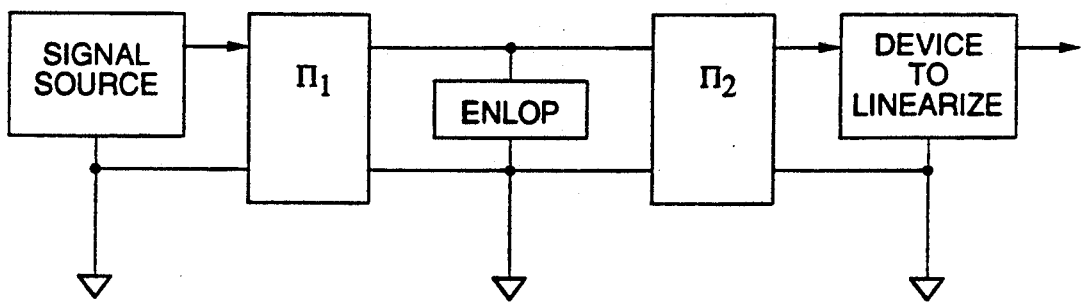
FIG. 7 depicts a general form of a shunt-expansive linearizer circuit, based on the ENLOP building block of this invention, embedded in shunt between two general coupling linear networks $\pi_1$ and $\pi_2$.

The most general form of shunt-expansive linearizer circuit is shown in FIG. 7. In this architecture the ENLOP one-port is connected in shunt between any two linear, substantially resistive two-ports $\pi_1$ and $\pi_2$.

NONLINEAR T-ATTENUATOR EMBODIMENT

Figure 8:
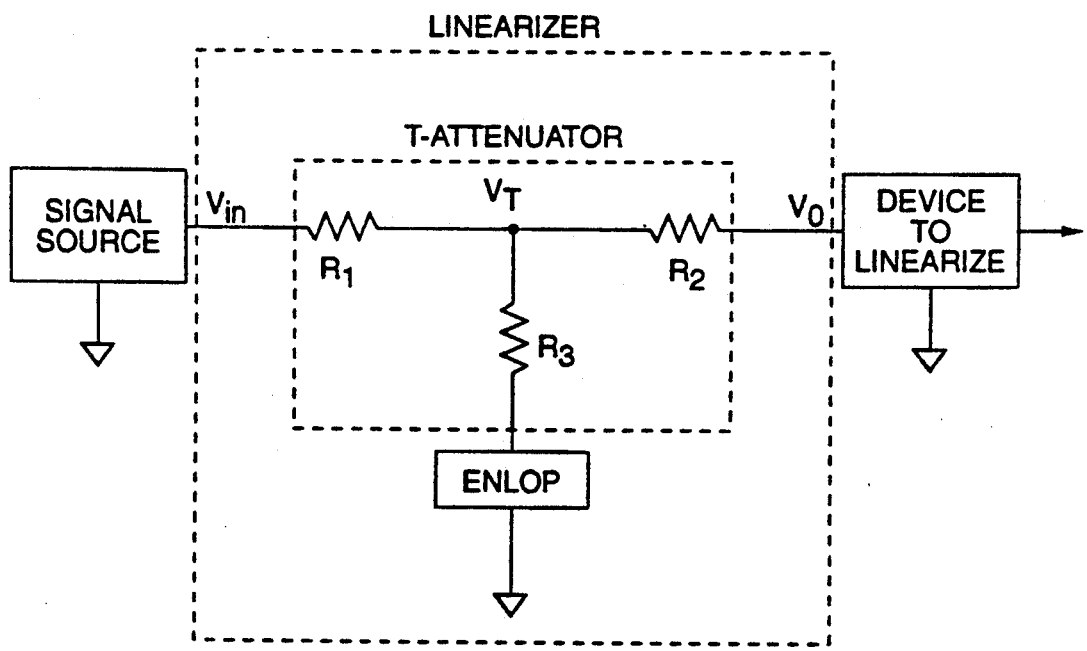
FIG. 8 depicts one embodiment of a shunt-expansive linearizer circuit as a nonlinear Tee attenuator.

An important special case embodiment is depicted in FIG. 8. The linearizer circuit is an electrical two-port obtained by connecting an ENLOP branch (which has an odd-wave expansive V-I characteristic) to in series with the base of the shunt resistor of a resistive Tee attenuator formed of Resistors R1, R2, and R3. For broadband operation, the ENLOP branch is preferably substantially free of any reactance such as capacitance and inductance. Specific implementations for this element were described above and it was seen that no capacitors are required, unlike the prior art. The nonlinear Tee attenuator embodiment of FIG. 8 is a special case of the general architecture of FIG. 7, with the two ports simply being two series resistors and with resistor R3 of FIG. 8 being absorbed into the ENLOP of FIG. 7. We shall use the nonlinear Tee attenuator by way of example to describe the operation of the linearizer.

An important feature of the V-I transfer characteristic of the ENLOP is that it is expansive: its impedance increases with amplitude, and it is connected in shunt across the path from the electrical source to the electrical load and ground. This results in an expansive voltage transfer characteristic of the linearizer circuit as described below in very intuitive terms:

When that the input voltage $V_{in}$ is steadily increased, the voltage $V_T$ at the junction of the resistor also increases and since the V-I characteristic of the ENLOP branch is expansive, its impedance increases. Thus less current is shunted through the ENLOP arm and more current flows forward through the load, resulting in a rate of increase of the output load voltage $V_o$ faster than that mandated by the rate of increase of input signal $V_{in}$. This results in an expansive nonlinear characteristic between $V_{in}$ and $V_o$.

As a special case of the Tee circuit, it is possible to eliminate either resistor $R_1$ or $R_2$ or $R_3$.

Figure 9:
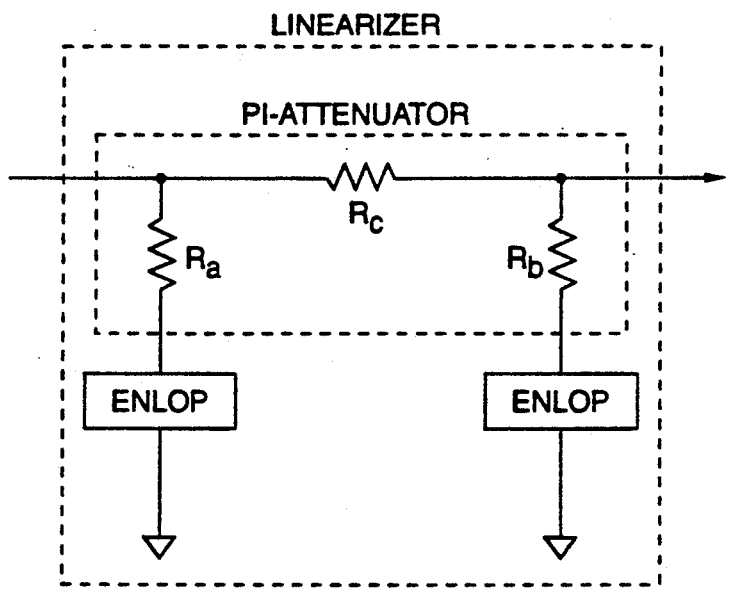
FIG. 9 depicts one embodiment of a shunt-expansive linearizer circuit as a nonlinear Pi attenuator.

Another generalization of the configuration involves attaching more than One ENLOP branch in shunt to various points in the circuit. An example is provided by the Pi-attenuator of FIG. 9.

Figure 10:
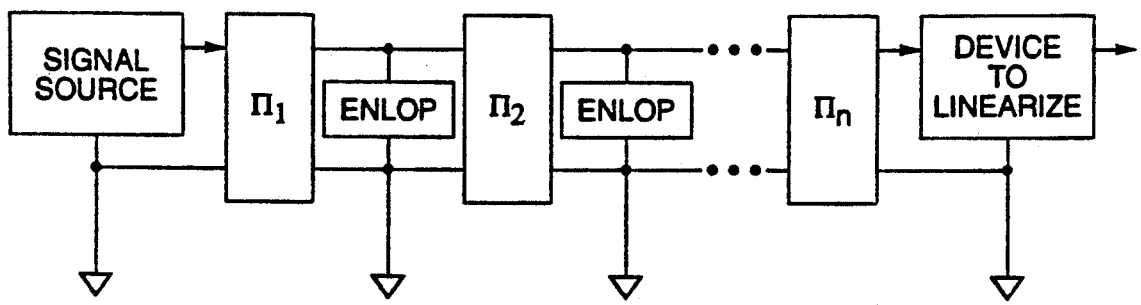
FIG. 10 depicts a general form of an electrically unbalanced version of a shunt-expansive linearizer circuit, based on multiple ENLOP building blocks, embedded in shunt within multiple linear networks.

Similarly, the general case of FIG. 10 depicts several ENLOP branches embedded between tandem two-ports chained between the source and load side. The principle of operation of the embodiment of FIG. 10 is similar to that of the embodiment of FIG. 8: it consists of reducing the shunting action of the V-I expansive ENLOP element as the input signal increases, thus diverting more current to the output to generate an expansive characteristic between the input and output voltages.

Notice that none of the embodiments of FIGS. 13a–13c in U.S. Ser. No. 685,966 cover the embodiments of this invention. It would be tempting to identify the basic ENLOP structure with the two back-to-back branches of FIG. 13a of U.S. Ser. No. 685,966, however, in the embodiments of the present invention the two back-to-back branches are connected in shunt whereas in the implementation of FIG. 13a of U.S. Ser. No. 685,966 the two back-to-back branches are connected in series between the source and load.

If the ENLOPs of this invention are connected as in FIG. 13a of U.S. Ser. No. 685,966, one would obtain a compressive voltage transfer characteristic, rather than the required expansive one.

The shunt architecture of this invention is an enabling factor allowing the utilization of the capacitor free ENLOPs of this invention.

BALANCED IMPLEMENTATIONS

Figure 11A:
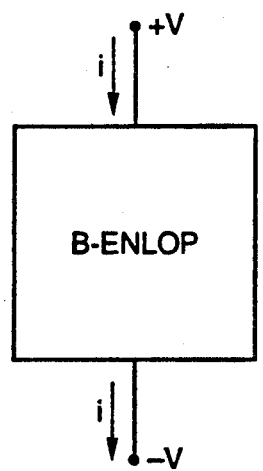
FIG. 11a is a schematic representation including reference voltages for a Balanced ENLOP, which is suitable for use as a building block for balanced linearizer circuits.
Figure 11B:
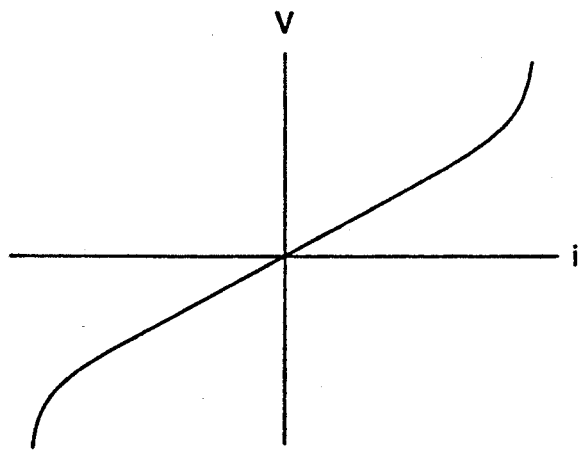

The embodiments described thus far have been electrically unbalanced, i.e. referenced to ground. A similar set of embodiments is based on balanced circuits. The basic building block of these embodiments is a balanced ENLOP, (B-ENLOP) such as the example depicted in FIG. 11a. This is a device which, when driven differentially with voltages $\pm v$ of opposite signs, yields a compressive odd wave current i(v), thus the V-I characteristic v(i) is expansive, as depicted in FIG. 11b.

Figure 12:
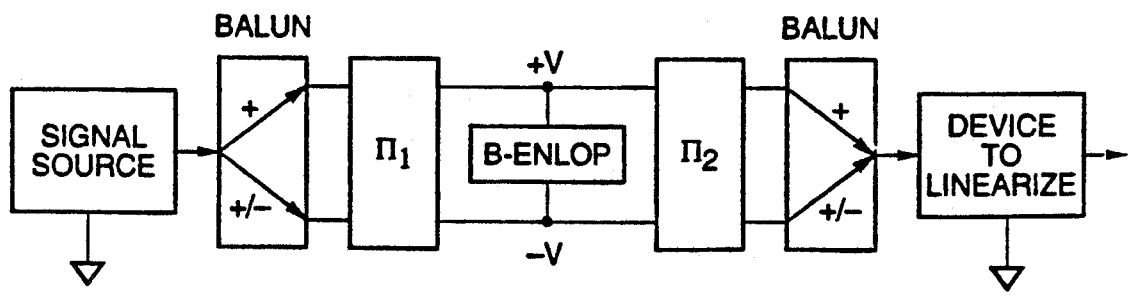
FIG. 12 depicts a general form of a balanced shunt-expansive linearizer circuit based on a balanced ENLOP building block and embedded in balun circuits (such as either 0 or 180 degree hybrids) to interface to unbalanced source and load.

FIG. 12 depicts the embedding of the balanced ENLOP into any two balanced two-ports $\pi_1$ and $\pi_2$. When the source and load are unbalanced single ended devices, balanced-unbalanced transitions (called baluns or hybrids) are necessary to make the transition from the unbalanced inputs and outputs to the balanced output of $\pi_1$ and the balanced input of $\pi_2$, respectively. The baluns can be realized, for example, as magic tee circuits or as transformers tapped and grounded at the center, as described, for example, in S. A. Maas, "Nonlinear Microwave circuits", Artech House, 1988 Section 5.1. These are devices used to split one signal into two signals which are either in phase (0 degree hybrid) or in anti-phase (180 degree hybrid), or they can be used in reverse to combine two signals by either adding them (0 degree hybrid) or subtracting them (180 hybrid).

Returning to the realization of the balanced ENLOPs, the simplest way is to utilize an unbalanced ENLOP connecting it between the differential drive points, rather than between the ground and the drive voltage point. Another way to generate a balanced ENLOP is to combine two inverted unbalanced ENLOPS as depicted in the example of FIG. 13.

Figure 13:
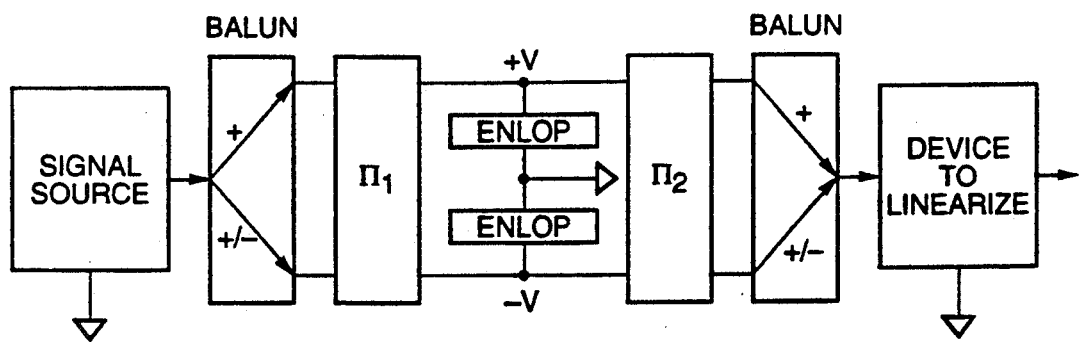
FIG. 13 is an alternative embodiment of FIG. 12 wherein the balanced ENLOP is provided by the connection of two unbalanced ENLOPS back to back.

The circuit of FIG. 13 is derived by applying the teaching of this invention to FIG. 13c of U.S. Ser. No. 685,966, with each of the two-ports of FIG. 13c of U.S. Ser. No. 685,966 derived from ENLOP one-ports by simply splitting each terminal of the one-port into one input terminal and one output terminal. However, what is unique to the embodiment of FIG. 13 of this invention is the embedding into the circuit already described in FIG. 13c of U.S. Ser. No. 685,966 of the ENLOP embodiments introduced in this invention.

Figure 14A:
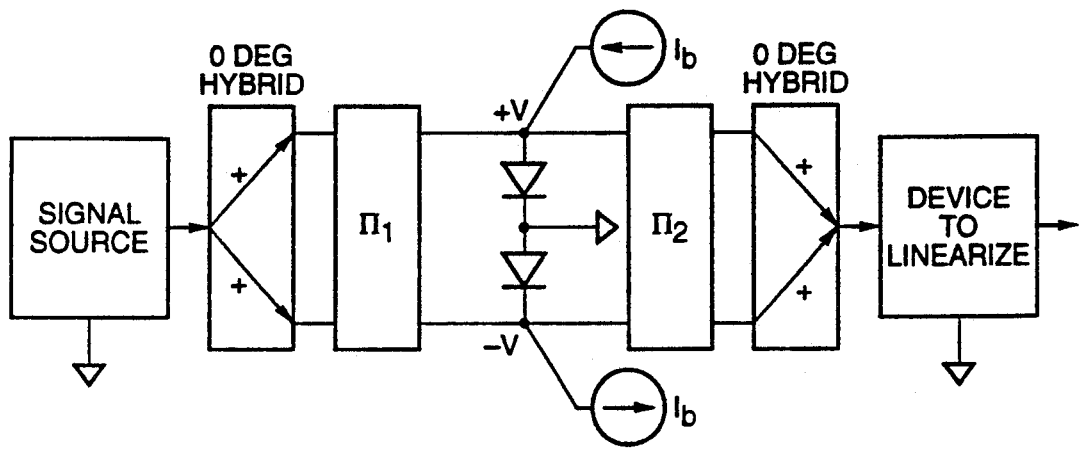
FIGS. 14a and 14b depict two other embodiments of shunt expansive linearizers based on balanced ENLOPs, using antiseries circuits differing by the bias connection and the polarities of the hybrids.
Figure 14B:
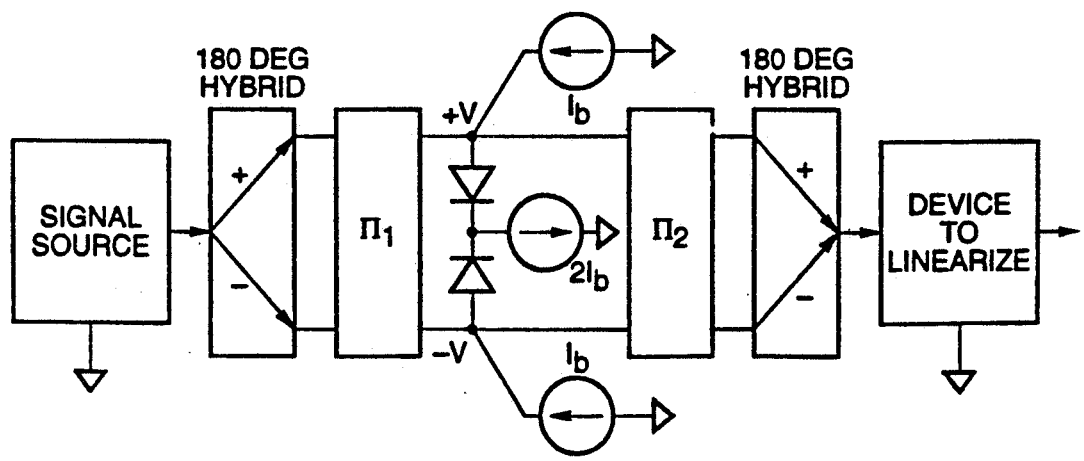

Other examples of balanced ENLOPs are depicted in FIGS. 14a and 14b, where it is shown that the diodes may be connected and biased in various ways depending on the polarity of the baluns used.

Figure 15:
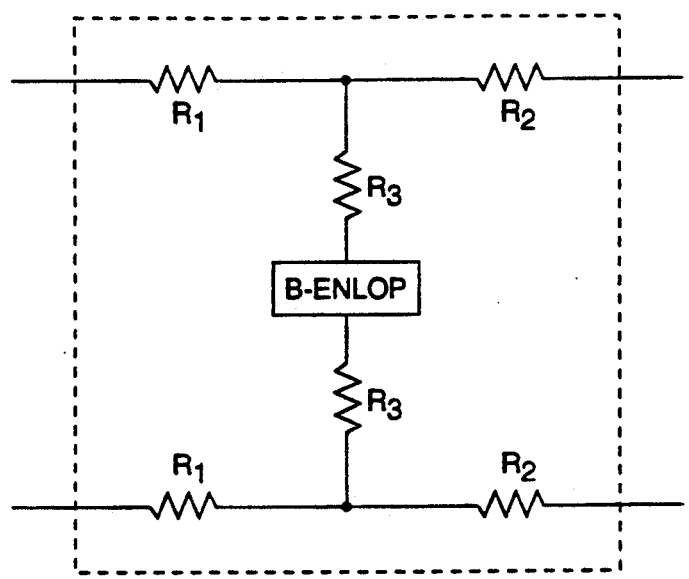
FIG. 15 depicts a shunt-expansive linearizer based on the embedding of a balanced ENLOP within two resistive Tee attenuators.

FIG. 15 depicts a more specific embodiment of the embedding of a balanced ENLOP: a balanced nonlinear T-attenuator version.

PREFERRED EMBODIMENTS

Figure 16:
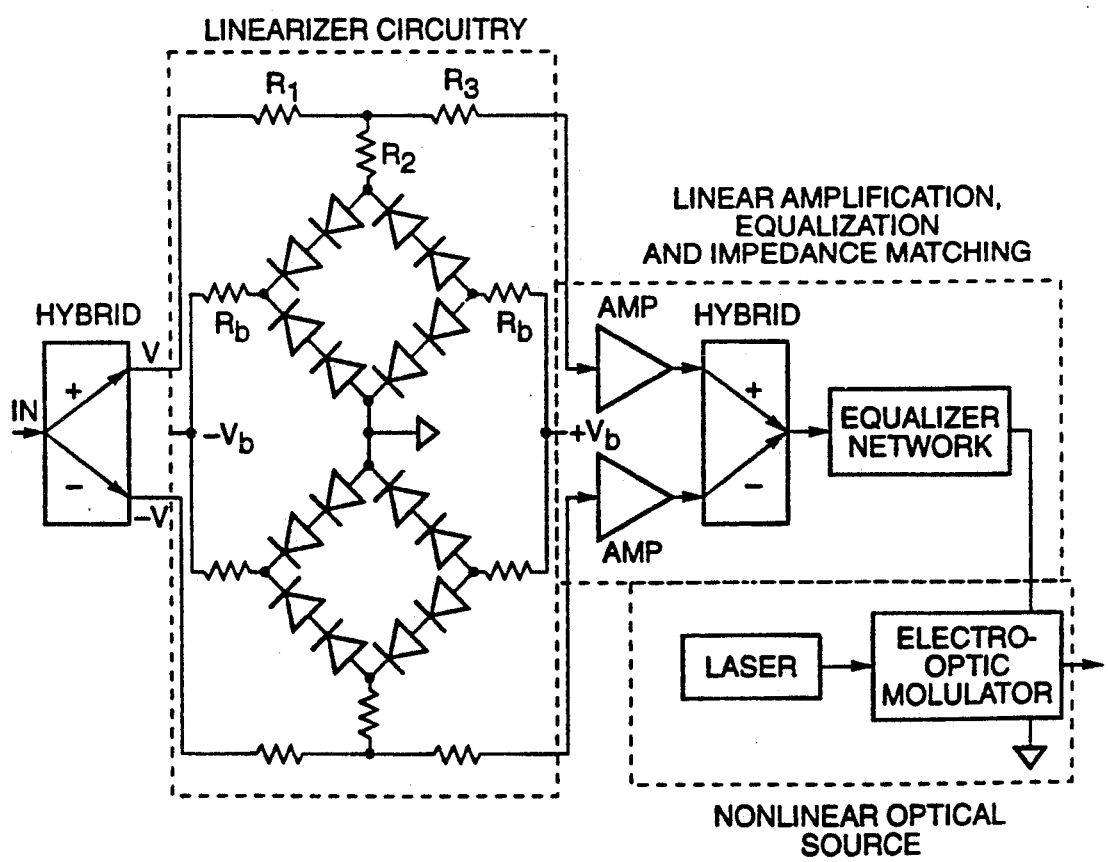
FIG. 16 depicts one embodiment which is a special case of the embodiment of FIG. 13, with the ENLOPs realized as diode bridges embedded in Tee attenuators and the two bias networks of the two bridges connected together for convenience.
Figure 17:
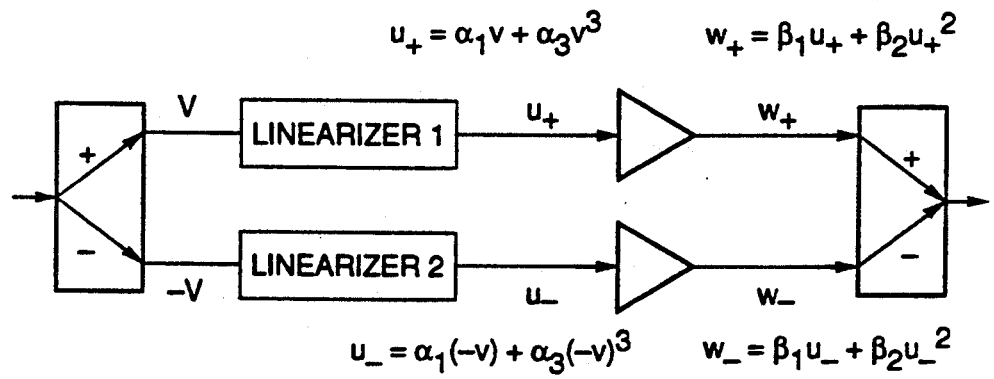
FIG. 17 is a power series analysis of the operation of the embodiment of FIG. 16.

A first preferred embodiment consists of a balanced linearizer described in FIG. 16: Two substantially identical ENLOP unbalanced circuits as in FIG. 5, consisting of diode bridges embedded in Tee attenuators are used to essentially generate a balanced ENLOP, which can be embedded between any two ports preceded and followed by baluns as in FIG. 13. In the preferred embodiment, the first linear two-port $\pi_1$ is absent (or is formally considered to be a trivial identity two port—a pair of connect-through-wires) whereas the second linear two port $\pi_2$ consists of a pair of amplifiers which are substantially linear except for small amounts of nonlinear distortion, and the baluns are realized as 180 degree hybrids. This yields a novel device reminiscent of a push-pull amplifier, but modified by the inclusion of the nonlinear Tee attenuators to act as a linearizer circuit with amplification. The effect of the sign reversals in the signal path due to the hybrids is that the nonlinearity of even order distortion generated in the amplifiers is cancelled upon recombination in the output hybrid, whereas the odd order nonlinearity generated in the two ENLOP circuits is re-enforced. This is detailed in the power series analysis of FIG. 17, demonstrating the reduction (or in principle the nulling) of even orders of distortion of the amplifiers, while the useful linear signal passing through the two branches and odd orders of intentional distortion generated in the linearizer ENLOP circuits are reinforced.

$$W_+ - W_- = 2\beta_1\alpha_1 V + 2\beta_1\alpha_3 V^3 \qquad (24)$$

The odd orders of distortion in the amplifiers are reinforced as well, so that amplifiers with low third and higher order distortion are required, but the requirements on even orders of distortion of the amplifiers are relaxed by the nulling effect of the network on these orders.

It follows that good cancellation of even orders of distortion is possible with such a scheme, easing the requirements on the quality of the amplifiers, however low odd order distortion (e.g. a high third order intercept) is still required of the amplifiers. Another advantage of this embodiment is that it provides 3 dB stronger signal amplification by virtue of the connection of the two amplifiers in parallel.

Thus, in this embodiment some of the advantages of push-pull amplifiers are combined here with the advantages of the nonlinear Tee attenuator circuits to yield a linearizer circuit with gain. The balanced bridge circuit is preferred to the diode antiseries circuit as choice of ENLOP for the preferred embodiments because the small remaining parasitic inductance is a factor of two lower than in the diode antiseries case, as the diode bridge circuit amounts to two antiseries circuits in parallel and the bridge circuit is generally more symmetrical, and therefore the bias is easier to realize.

In a second preferred embodiment (FIG. 18), a different balanced circuit is used which is a special case of the balanced T-attenuator circuit of FIG. 15, obtained by embedding a diode bridge ENLOP between two T-attenuators. In this circuit the bias resistors are at virtual zero RF ground.

As explained in U.S. Ser. No. 685,966, in order to balance the distortions generated in the linearizer circuit and optical source and effectively obtain a linear transfer characteristic, one needs to adjust the relationship between the gain following the linearizer and the Taylor series coefficients of the linearizer and modulator. Such control may be effected by means of tuning the bias currents to the ENLOP circuits.

A sufficient number of diodes needs to be used in the ENLOPs to derive the required nonlinearity, for a given available gain between the ENLOP and the device to be linearized. In order to ensure broadband suppression of the nonlinear distortion it is advantageous to construct the ENLOP circuits in a miniaturized fashion, and using either integrated electronics or microwave hybrid techniques in order to reduce parasitic capacitances and inductances.

When the diodes comprising an ENLOP are identical and the bias currents equal, the circuit is balanced in the sense that it produces no even order components, i.e. its transfer characteristics is odd. Some differences in the characteristics of the diodes will result in some even components in the transfer characteristic and some even orders of distortion. These are, if desired, offset by slightly altering the balance between the bias currents, retrieving an odd characteristic.

A third preferred embodiment (FIG. 19) separates the functions of linearization predistortion and linear push-pull amplification. The linearizer circuit precedes the linear amplification and is realized as an unbalanced nonlinear T-attenuator of FIG. 8 with the ENLOP taken as the nonlinear diode bride of FIG. 5. The linear amplification is realized as a push-pull amplifier, namely a pair of amplifiers between two 180 degree hybrids, which results in reduction in the second order distortion of the linear amplification block with respect to that of each amplifier separately, and provides 3 dB gain increase with respect to a single amplifier.

Figure 18:
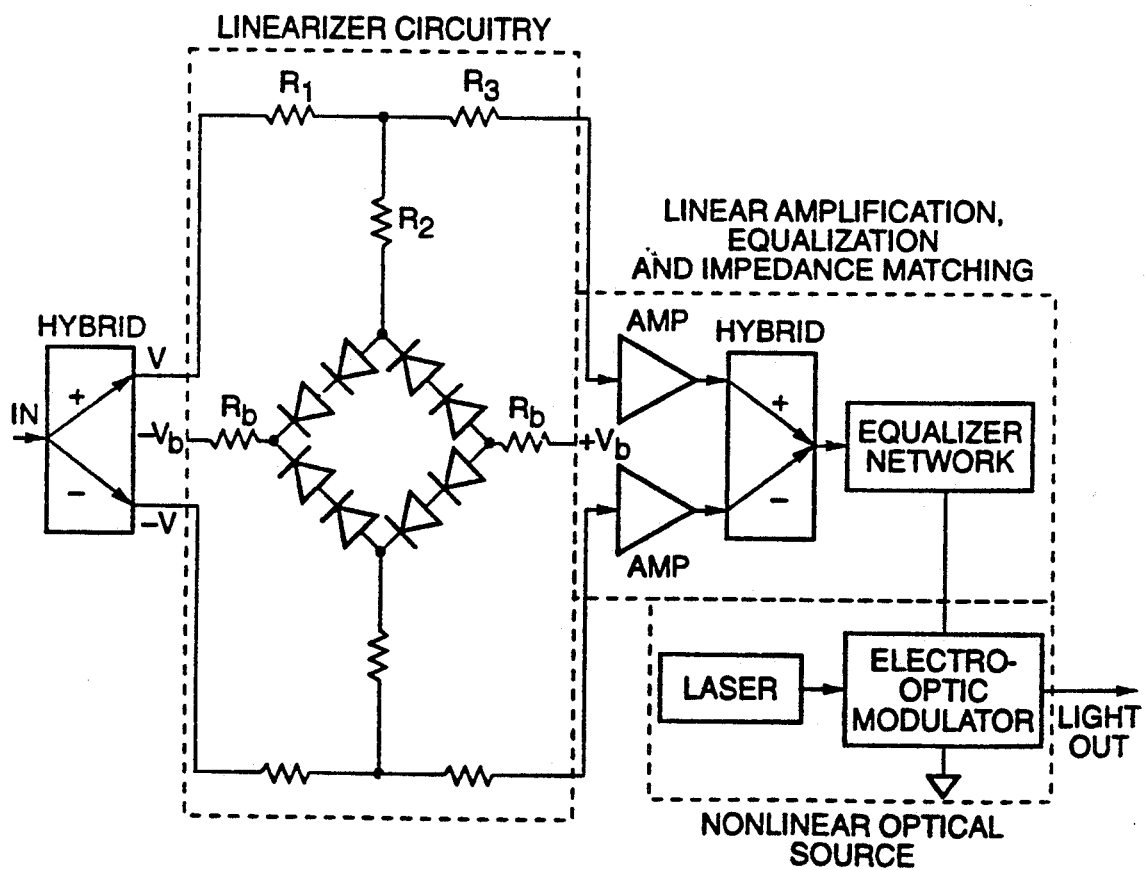
FIG. 18 depicts an embodiment in which two ENLOP diode bridge circuits as in FIG. 16 are replaced by the balanced linearizer circuit of FIG. 15, with the balanced ENLOP consisting of a diode bridge embedded in two Tee attenuators.
Figure 19:
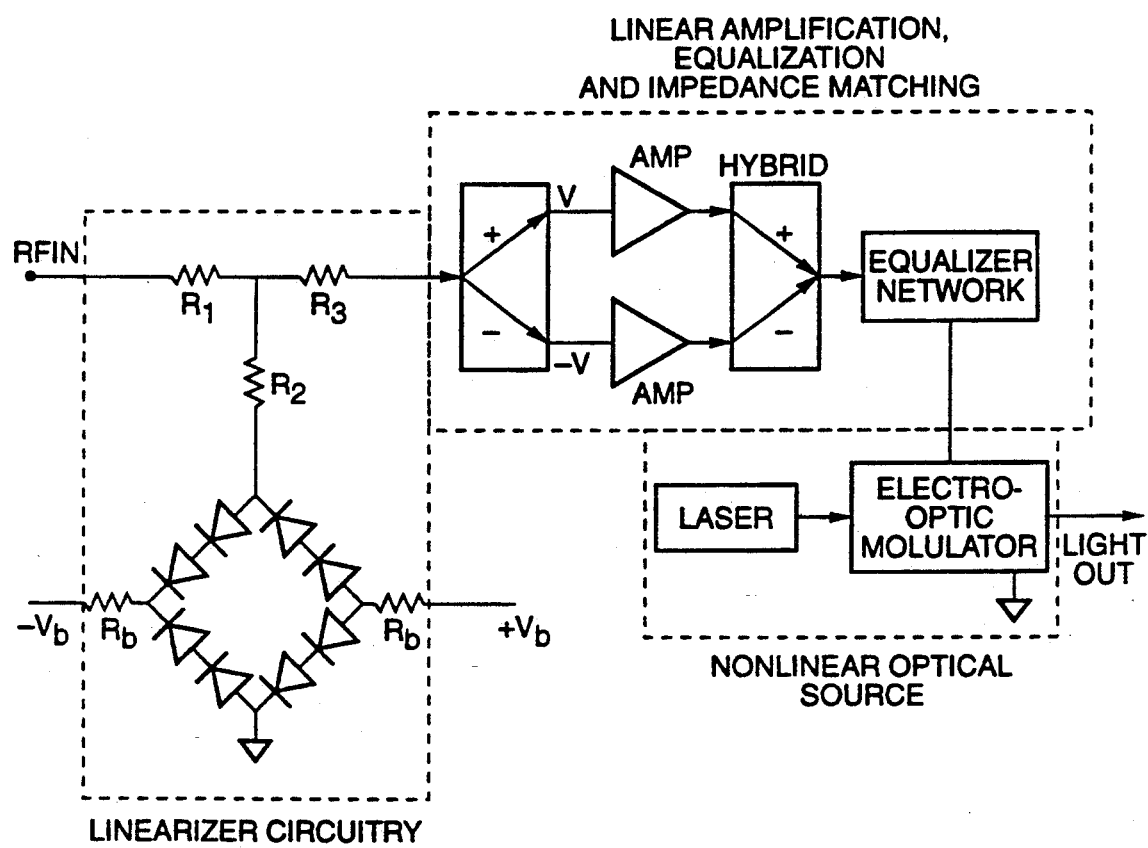
FIG. 19 depicts an alternative embodiment similar to that of FIG. 18.

In the embodiments of FIGS. 16, 18, and 19, an equalization network precedes the nonlinear optical source in order to compensate for the linear distortion of the optical source, namely to reduce the magnitude ripple and deviations away from linear phase of the linear frequency response of the modulator, which results in uniformly improved nonlinear beat suppressor across the frequency band.

Another important advantage of the embodiments of FIGS. 16, 18, and 19 is that of the desirable impedance transformations effected by the usage of hybrids and the push-pull architecture. It is a somewhat unfortunate quality of the state of the art of electro-optic modulators-integrated optics coplanar transmission line travelling wave electro-optic modulators that their impedance is approximately 25 Ohms, as described by R. Alferness, "Titanium Diffused Lithium Niobate Waveguide Devices", in "Guided-Wave Optoelectronics", to Tamir ed., Springer-Verlag, 1988, rather than the ubiquitous 50 Ohm impedance of RF components such as linear amplifiers. In any practical system there arises the need for impedance matching from 50 to 25 Ohms. A usual impedance matching technique is to connect a 25 Ohm resistor in series with the coplanar transmission line of the electro-optic modulator, resulting in a waste of half the RF power. Another impedance matching technique is to use a transformer, however such a transformer is difficult to realize broadband over the cable television band which spans more than a decade of frequency range, and its resultant ripple in linear magnitude and phase contribute to a reduction of the nonlinear beat suppression. On the other hand, a property of RF hybrids such as the one used to combine the two amplifiers in the embodiments of FIGS. 16, 18, and 19 is that at the combining port the impedance is halved, as described in S. A. Maas, "Nonlinear Microwave Circuits", Artech House, 1988 Section 5.1. Thus, using regular RF amplifiers with 50 Ohm output impedance results in an impedance of 25 Ohms at the hybrid combining port, which is suitable to drive the coplanar travelling wave electro-optic modulator thereby eliminating the need for additional impedance matching which would result in performance penalties as described above.

GENERALIZED APPLICATIONS

The description of the invention has been focused on linearizing optical sources with odd-wave characteristics such as electro-optic modulators. However, the circuits presented can be made to linearize the transfer characteristic of other optical sources such as DFB lasers or any electronic nonlinear device that has both even and odd characteristic by controlling the symmetry of the bias currents of the diodes or other nonlinear components included in the ENLOP circuits or possibly using a different number of diodes in each branch wherein the diodes point in a certain way. Conversely, the generation of intentional second order components is achieved by making the two bias currents unequal and the relative mixture of odd order and even order is controlled by changing the ratio between the two bias currents.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A linearized transmission system comprising:
   a transmission means having a non-linear transfer characteristic between its input port and one or more optical output ports;
   an input signal port;

a linearization circuit connected between said input signal port and said input port of said transmission means, comprising:
  an input port connected to said input signal port;
  an output port connected to said input port of said transmission means;
  one or more two-port linear circuit cascaded between said input port and said output port of said linearization circuit, such that the output of one of said two-port linear circuits is connected to the input of the next of said two-port linear circuit; and
  one or more one-port nonlinear circuits connected in parallel across the common output and input port connections or each cascaded pair of said two-port linear circuits, wherein the gains of said two-port linear circuits and the amount of non-linearity of said one-port nonlinear circuits are chosen such that the overall transfer characteristic from said input signal port to said output port of said transmission means is substantially linear.

2. A system as in claim 1 having a single one of said one-port nonlinear circuits and two of said two-port linear circuits.

3. A system as in claim 2 which further comprises a three terminal linear network having a first terminal connected to a first output lead of a first of said two-port linear circuits, a second terminal connected to a first lead of said nonlinear one-port circuit, and a third terminal connected to a first input lead of a second of said two-port linear circuits, and a second lead of said nonlinear one-port circuit being connected to a second output lead of said first two-port linear circuit and a second input lead of said second two-part linear circuit.

4. A system as in claim 2 wherein each of said three terminal linear networks comprises three linear one-port circuits comprising a left, a right, and a middle linear one-port circuit connected to a junction point.

5. A system as in claim 4 wherein each of said left, right and middle linear one-port circuits comprises a resistor.

6. A system as in claims 1 or 2 wherein said nonlinear one-port circuit comprises an array of four diode branches topologically connected in a bridge network, two diagonal corners of said bridge network serving as two signal terminals of said one-port and the other two diagonal corners of said bridge network each being connected to a bias means.

7. A system as in claim 6 wherein said nonlinear one-port circuit comprises:
  a first set of one or more diodes connected between said first input lead and said first bias lead of said bridge network in a first polarity with respect to said first input lead of said bridge network;
  a second set of one or more diodes connected between said first input lead and said second bias lead of said bridge network in a second polarity with respect to said first input lead of said bridge network;
  a third set of one or more diodes connected between said second input lead and said first bias lead of said bridge network in said first polarity with respect to said second input lead of said bridge network; and
  a fourth set of one or more diodes connected between said second input lead and said second bias lead of said bridge network in said second polarity with respect to said second input lead of said bridge network.

8. A system as in claim 6 wherein said bias means comprise current sources.

9. A system as in claim 6 wherein said bias means comprise bias voltages connected in series with resistors.

10. A system as in claim 1 wherein at least one of said one or more one-port nonlinear circuits are connected between adjacent two-pots by a three terminal linear network having a first terminal connected to a first output lead of a first of said two-port linear circuits, a second terminal connected to a first lead of said non-linear one-port circuit, and a third terminal connected to a first input lead of a second of said two-port linear circuits, and a second lead of said nonlinear one-port circuit being connected to a second output lead of said first two-port linear circuit and a second input lead of said second two-part linear circuit.

11. A system as in claim 10 wherein each of said three terminal linear networks comprises three linear one-port circuits comprising a left, a right, and a middle linear one-port circuit connected to a junction point.

12. A system as in claim 11 wherein each of said left, right and middle linear one-port circuits comprises a resistor.

13. A system as in claims 1 or 2 wherein one or more of said one-port nonlinear circuits each comprise:
  a first input lead;
  a second input lead;
  an internal node;
  a first set of one or more series-connected diodes connected between said first input lead and said internal node in order to carry current to said internal node in a first polarity;
  a second set of one or more series-connected diodes connected between said second input lead and said internal node in order to carry current to said internal node in said first polarity;
  a first bias means connected to said first input port; and
  a second bias source connected to said internal node.

14. A system as in claims 1 or 2 wherein one or more of said one-port nonlinear circuits each comprise a plurality of arrays connected in parallel, each of said arrays comprising four diode branches topologically connected in a bridge network, two diagonal corners of said bridge network serving as two signal terminals of said one-port and the other two diagonal corners of said bridge network being connected to bias means.

15. A system as in claims 1 or 2 which further comprises:
  a splitter having a first output lead connected to a first lead of the first of said one or more two-port linear circuits, a second output lead connected to a second lead of said first of said one or more two-port linear circuits, and an input lead connected to said input signal port; and
  a combiner having a first input lead connected to a first lead of the output port of the last of said two-port linear circuits, a second input lead connected to a second lead of said output leads of said last of said two-port linear circuits, and an output lead connected to said input port of said transmission means.

16. A system as in claim 15 wherein one or more of said one-port nonlinear circuits each comprise:
  a first one-port circuit having a first terminal and having a second terminal serving as one of said two leads of said one-port nonlinear circuit; and a second one-port circuit having a first terminal connected to said first terminal of said first one-port circuit and a second terminal serving as the other of said two leads of said one-port nonlinear circuit.

17. A system as in claim 16 wherein said first terminal of said first and second one-port circuits are connected to a common electrical ground, said input signal port receives an input signal referenced to said common electrical ground, and said transmission means receives on its input port from said linearization circuit a modulation signal referenced to said common electrical ground.

18. A system as in claim 15 wherein said splitter comprises a 180° splitter and said combiner comprises a 180° combiner.

19. A system as in claim 1 wherein said transmission means comprises a nonlinear modulatable optical source having a nonlinear transfer characteristic between its electrical input and its optical output.

20. A system as in claim 19 wherein said first terminal of said first one-port circuit is connected to a common electrical ground, said input signal port receives an input signal referenced to said common electrical ground, and said nonlinear modulatable optical source receives on its electrical input from said linearization circuit a modulation signal referenced to said common electrical ground.

21. A system as in claim 19 wherein said modulatable optical source comprises a laser and an electro-optic modulator.

22. A system as in claim 21 wherein said laser has an output connected to an optical input of said electrical optic modulator, and said electro-optic modulator has an electrical modulation input port serving as said input port of said transmission means and at least one optical output port serving as said one or more optical output ports of said transmission means.

23. A system as in claim 21 wherein said modulator is biased at the quadrature point where its voltage to light power transfer characteristic is substantially an odd mathematical function.

24. A linearized transmission system comprising:
an optical transmission device having a modulation input port and at least one modulated optical signal output port, said optical transmission device having a non-linear transfer characteristic;
an information signal input port;
a splitter having an input port connected to said information signal input port and a first and a second output lead;
a linearization circuit comprising:
an input port, having a first input lead connected to said first output lead of said splitter and a second input lead connected to said second output lead of said splitter;
an output port, having a first and a second output lead;
a one-port nonlinear circuit including a bridge network comprising:
a first and a second input lead;
a first bias lead connected to a first bias source;
a second bias lead connected to a second bias source;
a first set of one or more diodes connected between said first input lead and said first bias lead of said bridge network in a first polarity with respect to said first input lead of said bridge network;
a second set of one or more diodes connected between said first input lead and said second bias lead of said bridge network in a second polarity with respect to said first input lead of said bridge network;
a third set of one or more diodes connected between said second input lead and said first bias lead of said bridge network in said first polarity with respect to said second input lead of said bridge network; and
a fourth set of one or more diodes connected between said second input lead and said second bias lead of said bridge network in said second polarity with respect to said second input lead of said bridge network;
a first three terminal linear network having a first terminal connected to a first lead of said input port of said linearization circuit, a second terminal connected to said first input lead of said nonlinear one-port circuit, and a third terminal connected to a first lead of said output port of said linearization circuit;
a second three terminal linear network having a first terminal connected to a second lead of said input port of said linearization circuit, a second terminal connected to said second input lead of said nonlinear one-port circuit, and a third terminal connected to a second lead of said output port of said linearization circuit; and
a combiner, having a first input lead connected to said first output lead of said linearization circuit, a second in put lead connected to said second output lead of said linearization circuit, and an output port connected to said modulation input port of said optical transmission device,
wherein the attenuation provided by said linear networks and the amount of nonlinearity of said linearization circuit provide an overall transfer characteristic from said input signal port to said output port of said transmission means which is substantially linear.

25. A system as in claim 24 wherein each of said three terminal linear networks comprises three linear one-port circuits comprising a left, a right, and a middle linear one-port circuit connected to a junction point and providing said first, second, and third terminals, respectively.

26. A system as in claim 24 wherein said first and second three terminal linear networks are connected to the output leads of said splitter and said input leads of said combiner via a first and second two-port linear network, respectively.

27. A system as in claim 25 wherein each of said left, right and middle linear one-port circuits comprises a resistor.

28. A system as in claim 24 wherein said splitter comprises a 180° splitter and said combiner comprises a 180° combiner.

29. A system as in claim 24 which further comprises:
a first amplifier having an input lead connected to said first output lead of said linearization circuit and having an output lead connected to said first input lead of said combiner; and
a second amplifier having an input lead connected to said second output lead of said linearization circuit and an output lead connected to said second input lead of said combiner.

30. A system as in claim 24 wherein said first and second bias sources each comprise a resistor connected in series with a bias voltage source.

31. A system as in claim 24 which further comprises a frequency equalization network connected between said output port of said combiner and said modulation input port of said optical transmission device.

32. A system as in claim 24 wherein said first and second bias sources each comprise a current source.

33. A system as in claim 24 wherein said modulatable optical source comprises a laser and an electro-optic modulator.

34. A system as in claim 33 wherein said laser has an output connected to an optical input of said electrical optic modulator, and said electro-optic modulator has an electrical modulation input port serving as said input port of said transmission means and an optical output port serving as said output port of said transmission means.

35. A system as in claim 33 wherein said modulator is biased at the quadrature point where its voltage to light power transfer characteristic is substantially an odd mathematical function.

36. A linearized transmission system comprising:
an optical transmission device having a modulation input port and at least one modulated optical signal output port, said optical transmission device having a non-linear transfer characteristic;
an information signal input port;
a splitter having an input port connected to said information signal input port and a first and a second output lead;
a linearization circuit comprising:
an input port, having a first input lead connected to said first output lead of said splitter and a second input lead connected to said second output lead of said splitter;
an output port, having a first and a second output lead;
a nonlinear network comprising:
a first and a second input lead;
a first bias lead connected to a first bias source;
a second bias lead connected to a second bias source;
a third bias lead connected to a third bias source;
a fourth bias lead connected to a fourth bias source;
a first diode bridge network comprising:
a first set of one or more diodes connected between said first input lead and said first bias lead in a first polarity with respect to said first input lead;
a second set of one or more diodes connected between said first input lead and said second bias lead in a second polarity with respect to said first input lead;
a third set of one or more diodes connected between an intermediate node and said first bias lead in said first polarity with respect to said intermediate node; and
a fourth set of one or more diodes connected between said intermediate node and said second bias lead in said second polarity with respect to said intermediate node; a second diode bridge network comprising:
a first set of one or more diodes connected between said second input lead and said third bias lead in a first polarity with respect to said second input lead;
a second set of one or more diodes connected between said second input lead and said fourth bias lead in a second polarity with respect to said second input lead;
a third set of one or more diodes connected between said intermediate node and said third bias lead in a third polarity with respect to said intermediate node; and
a fourth set of one or more diodes connected between said intermediate node and said fourth bias lead in a fourth polarity with respect to said intermediate node;
a first three terminal linear network having a first terminal connected to a first lead of said input port of said linearization circuit, a second terminal connected to said first lead of said nonlinear network, and a third terminal connected to a first lead of said output port of said linearization circuit;
a second terminal linear network having a first terminal connected to a second lead of said input port of said linearization circuit, a second terminal connected to said second lead of said nonlinear network, and a third terminal connected to a second lead of said output port of said linearization circuit; and
a combiner, having a first input lead connected to said first output lead of said linearization circuit, a second input lead connected to said second output lead of said linearization circuit, and an output port connected to said modulation input port of said optical transmission device,
wherein the attenuation provided by said linear networks and the amount of nonlinearity of said linearization circuit provide overall transfer characteristic from said input signal port to said output port of said transmission means which is substantially linear.

37. A system as in claim 36 wherein each of said three terminal linear networks comprises three linear one-port circuits comprising a left, a right, and a middle linear one-port circuit connected to a junction point and comprising said first, second, and third terminals, respectively.

38. A system as in claim 37 wherein each of said left, right and middle linear one-port circuits comprises a resistor.

39. A system as in claim 36 wherein said first and second three terminal linear networks are connected to the output leads of said splitter and said input leads of said combiner via a first and second two-port linear network, respectively.

40. A system as in claim 36 wherein said splitter comprises a 180° splitter and said combiner comprises a 180° combiner.

41. A system as in claim 39 wherein said second two-port linear network comprises:
a first amplifier having an input lead connected to said first output lead of said linearization circuit and having an output lead connected to said first input lead of said combiner; and
a second amplifier having an input lead connected to said second output lead of said linearization circuit and having an output lead connected to said second input lead of said combiner.

42. A system as in claim 36 wherein said bias source each comprise a resistor connected in series with a bias voltage source.

43. A system as in claim 36 which further comprises a frequency equalization network connected between said output port of said combiner and said modulation input port of said optical transmission device.

44. A system as in claim 36 wherein said bias sources each comprise current sources.

45. A system as in claim 36 wherein said modulatable optical source comprises a laser and an electro-optic modulator.

46. A system as in claims 36 or 45 wherein said intermediate node of said linearization circuit is connected to ground, said input signal port receives an input signal referenced to ground, and said modulation input port of said optical transmission device receives a modulation signal from said linearization network which is referenced to ground.

47. A system as in claim 45 wherein said laser has an output connected to an optical input of said electrical optic modulator, and said electro-optic modulator has an electrical modulation input port serving as said input port of said transmission means and an optical output port serving as said output port of said transmission means.

48. A system as in claim 45 wherein said modulator is biased at the quadrature point where its voltage to light power transfer characteristic is substantially an odd mathematical function.

49. A linearized transmission system comprising:
an optical transmission device having a modulation input port and at least one modulated optical signal output port, said optical transmission device having a non-linear transfer characteristic;
an information signal input port;
a linearization circuit comprising:
an input port, having a first input lead connected to said information signal input port;
an output port connected to said modulation input port of said optical transmission device;
a bridge network comprising:
a first and a second input lead;
a first bias lead connected to a first bias source;
a second bias lead connected to a second bias source;
a first set of one or more diodes connected between said first input lead and said first bias lead of said bridge network in a first polarity with respect to said first input lead of said bridge network;
a second set of one or more diodes connected between said first input lead and said second bias lead said bridge network in a second polarity with respect to said first input lead of said bridge network;
a third set of one or more diodes connected between said second input lead and said first bias lead of said bridge network in said first polarity with respect to said second input lead of said bridge network; and
a fourth set of one or more diodes connected between said second input lead and said second bias lead of said bridge network in a second polarity with respect to said second input lead of said bridge network;
a three terminal linear network having a first terminal connected to a first lead of said input port of said linearization circuit, a second terminal connected to said first lead of said bridge network, and a third terminal connected to a first lead of said output port of said linearization circuit;
said second input lead of said bridge network being connected to a second lead of said input port and a second lead of said output port of said linearization circuit;
wherein the attenuation provided by said linear network and the amount of nonlinearity of said linearization circuit provided overall transfer characteristic from said input signal port to said output port of said transmission means which is substantially linear.

50. A system as in claim 49 wherein each of said three terminal linear networks comprises three linear one-port circuits comprising a left, a right, and a middle linear one-port circuit connected to a junction point.

51. A system as in claim 50 wherein each of said left, right and middle linear one-port circuits comprises a resistor.

52. A system as in claim 49 wherein said third terminal of said three terminal linear network and said second input lead of said bridge network are connected to said output port via a two-port linear network.

53. A system as in claims 49 or 52 which further comprises:
a splitter having an input port connected to said third terminal of said three terminal linear circuit and having a first and a second output lead;
a combiner, having a first and a second input lead, and an output port connected to said modulation input port of said optical transmission device;
a first amplifier having an input lead connected to said first output lead of said splitter and having an output lead connected to said first input lead of said combiner; and
a second amplifier having an input lead connected to said second output input lead of said splitter and an output lead connected to said second input lead of said combiner.

54. A system as in claims 49 or 52 which further comprise an equalizer network having an input lead connected to the output lead of said combiner and an output lead connected to said modulation input port of said optical transmission device.

55. A system as in claim 53 which further comprises an equalizer network having an input lead connected to the output lead of said combiner and an output lead connected to said modulation input port of said optical transmission device.

56. A system as in claim 53 wherein said splitter comprises a 180° splitter and said combiner comprises a 180° combiner.

57. A system as in claim 49 wherein said first and second bias source each comprise a resistor connected in series with a bias voltage.

58. A system as in claim 49 wherein said first and second bias source each comprise a current source.

59. A system as in claim 49 wherein said optical transmission device comprises a nonlinear modulatable optical source having a nonlinear transfer characteristic.

60. A system as in claim 59 wherein said modulatable optical source comprises a laser and an electro-optic modulator.

61. A system as in claim 60 wherein said modulator is biased at the quadrature point where its characteristic is substantially odd wave.

62. A linearized transmission system as in claim 1 wherein said one or more one-port nonlinear circuits connected in parallel across the common output and input port connections of each cascaded pair of said two-port linear circuits comprise:

- a first resistor connected between a first output lead and a first input lead of a cascaded pair of said two-port linear circuits;
- a second resistor connected in series with a first one-port nonlinear circuit across said first and a second output lead of said output port of the first of said cascaded pair of said two-port linear circuits; and
- a third resistor connected in series with a second one-port linear circuit across said first and a second input lead of said input port of the second of said cascaded pair of said two-port linear circuits.

63. A system as in claims 7, 24, 36 or 49 wherein said diodes are forward biases by said bias leads.

64. A system as in claim 13 wherein said diodes are forward biased by said bias leads.

65. A system as in claim 14 wherein said diodes are forward biased by said bias leads.

* * * * *